United States Patent [19]

Fitzsimmons

[11] Patent Number: 4,534,747
[45] Date of Patent: Aug. 13, 1985

[54] TRANSMISSION

[76] Inventor: Clement J. Fitzsimmons, 12338 Lakeshore Dr., Lakeside, Calif. 92040

[21] Appl. No.: 522,598

[22] Filed: Aug. 12, 1983

[51] Int. Cl.³ .............................................. F16H 9/00
[52] U.S. Cl. .......................................... 474/1; 74/203
[58] Field of Search ....................... 474/1; 74/202, 203

[56] References Cited

U.S. PATENT DOCUMENTS

| 1,803,186 | 4/1931 | Hendrickson | 474/1 |
| 3,280,647 | 10/1966 | Fell | 474/1 |
| 4,046,022 | 9/1977 | Henderson | 74/203 |

FOREIGN PATENT DOCUMENTS

| 73966 | 3/1952 | Denmark | 474/1 |
| 139552 | 10/1980 | Japan | 474/1 |

Primary Examiner—James A. Leppink
Assistant Examiner—Frank H. McKenzie, Jr.
Attorney, Agent, or Firm—Thomas J. Tighe

[57] ABSTRACT

A transmission rotatable coaxially about a crankshaft. The transmission is rotatable to three positions: forward, idle, and reverse. Four pulleys are rotatably affixed to the casing such that each pulley occupies the corner of an imaginary square, the diagonals of the square intersecting the longitudinal axis of the crankshaft. The planes of the pulleys all lie in a single plane generally perpendicular to the crankshaft. Thus as the casing is rotated the pulleys rotate coaxially about the crankshaft. Two of the pulleys occupying adjacent corners are driven in opposite directions by gear and/or chain and sprocket means disposed in the casing. The other two pulleys are free turning. The casing pulleys are belt coupled to a pulley on a drive shaft. When the casing is in the forward position, the belt is in contact with one of the driven pulleys and one of the free turning pulleys only. When the casing is in the idle position the belt is in contact only with the two free turning pulleys. When the casing is in the reverse position, the belt is in contact with the other driving pulley and one of the free turning pulleys. The casing pulleys may be on the same side of the casing as is the crankshaft or they may be on the side opposite the crankshaft.

9 Claims, 7 Drawing Figures

TRANSMISSION

BACKGROUND OF THE INVENTION

This invention relates to transmissions in general and in particular to transmissions which are belt coupled to their associated drive shafts. It is also related to those transmissions which turn in their entirety.

This transmission was designed primarily for small engines such as those which power lawn mowers and go-carts. In machines or vehicles using those small engines, it is desirable to have more than just a forward and an idle mode. In order to have a reverse mode, one must have some sort of a transmission. It is highly advantageous if such a transmission matches the characteristics of the engine, that is, small, light weight, inexpensive, and easy to operate. Furthermore, it is highly advantageous if a clutching mechanism is not required.

This invention presents such a transmission. It is very simply in design as compared to transmissions presented heretofore, and it can be packaged in a very small casing. It permits a user to operate the machinery or the vehicle in three modes: forward, reverse and idle. It can be made inexpensively and retrofitted on most engines.

Another advantageous feature of this invention is that the drive shaft can be offset from the engine crankshaft. As used herein the term "crankshaft" shall include the rotor shaft of electric and other type engines as well as the crankshaft of piston driven engines.

Other advantages and attributes of this invention will be readily discernable upon a reading of the text hereinafter.

SUMMARY OF THE INVENTION

This invention presents a casing having at least one planar wall. Extending into the casing through an orifice is a first shaft means for transmitting the rotational power from the engine to the transmission. A pair of drive pulleys are affixed to shafts which extend into the casing through orifices in the planar wall. A gear means disposed within the casing and cooperable with the first shaft drives the shaft of one of the pulleys in a direction opposite to the direction of the first shaft. A chain and sprocket means disposed within the casing and cooperable with the first shaft drives the other pulley in a direction the same as the first shaft. A pair of freely turning pulleys are rotatably affixed to the planar surface of the casing. The free pulleys are spaced apart from the two drive pulleys and from each other such that the pulleys occupy adjacent corners of an imaginary square on the planar wall of the casing. The center of the imaginary square, that is, where the diagonals would intersect, is aligned coaxially with the first shaft. The transmission casing itself is rotatable coaxially with the first shaft. Thus, when the transmission casing is rotated to a position where only two of the pulleys are in contact with the belt, the drive shaft will either be rotating in the same direction as the first shaft, in the opposite direction, or will not be urged to rotate at all.

An object of this invention is to provide a low profile, thin transmission adaptable to provide a forward, reverse, and idle mode for small engines.

A further object of this invention is to provide a transmission which may be retrofitted onto lawn mowers, go-carts, and the like.

A third object of this invention is to provide a clutch-free transmission for small engines.

Other objects of this invention will be readily apparent upon a reading of the text hereinafter.

DESCRIPTION OF THE PREFERRED EMBODIMENT

Figure 1:
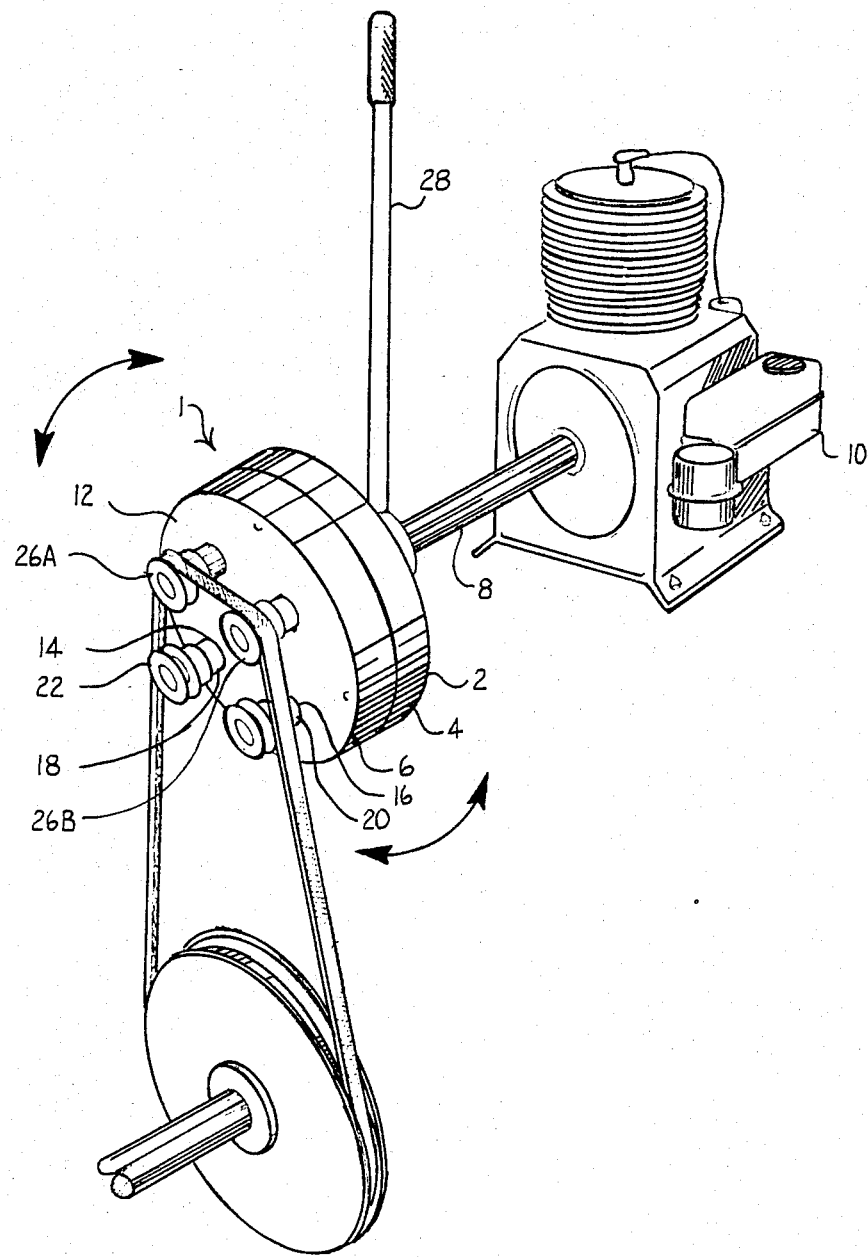
FIG. 1 is a pictorial view of the invention coupled between an engine and a drive shaft.

Referring to FIG. 1, a disc-like housing 2 is comprised of two halves 4 and 6. A side 4 defines a center orifice (not shown) through which a first shaft 8 extends into the casing 2. The first shaft transmits the rotational power from an engine 10 to the invention generally designated 1.

Referring again to FIG. 1, the other half 6 of the casing has a planar surface 12. The planar surface 12 defines at least two orifices 14 and 16. A second shaft 18 parallel to the first shaft extends through the first planar wall orifice 14. A third shaft 20 extends through the second planar wall orifice 16. A first pulley 22 is affixed to the second shaft 18 and a second pulley 24 is affixed to the third shaft 20. The planes of the first and second pulleys are aligned. A pair of free turning pulleys 26A and 26B are rotatably affixed to the planar wall 12. The four casing pulleys 22, 24, 26A and 26B are spaced apart from each other such that each occupies one corner of an imaginary square. The diagonals of the square intersect the longitudinal axis of the first shaft 8. The casing 2 is adapted to rotate coaxially about the first shaft. A lever 28 provides the means for such rotation. The planes of the casing pulleys are all aligned in a plane generally perpendicular to the axis of casing rotation.

Referring again to FIG. 1, a drive shaft pulley 30 is affixed to a drive shaft 32. The drive shaft pulley 30 is coupled to at least two of the transmission pulleys by means of a belt 34. As mentioned before the casing 2 can rotate coaxially with respect to the first shaft 8. The position in which it is shown in FIG. 1 is the idle position wherein the belt only makes contact with the two freely turning pulleys 26A and 26B. Since those pulleys are not driven, the drive shaft 32 is not urged to rotate. As will be discussed later, the drive pulley 22 and second drive pulley 24 are driven by the first shaft 8. Thus, if the casing 2 is rotated by lever 28 90° clockwise, the belt will then be in contact with the first drive pulley 22 and one of the free pulleys. In that situation the drive shaft will be urged to turn in the direction of the first pulley 22. If the casing were rotated 90° counter-clockwise from the idle position, the belt would then be in contact with the second drive pulley 24 and the other free pulley. In such a situation the drive shaft would be urged to rotate in the direction which the second pulley 24 is rotated.

Figure 2:
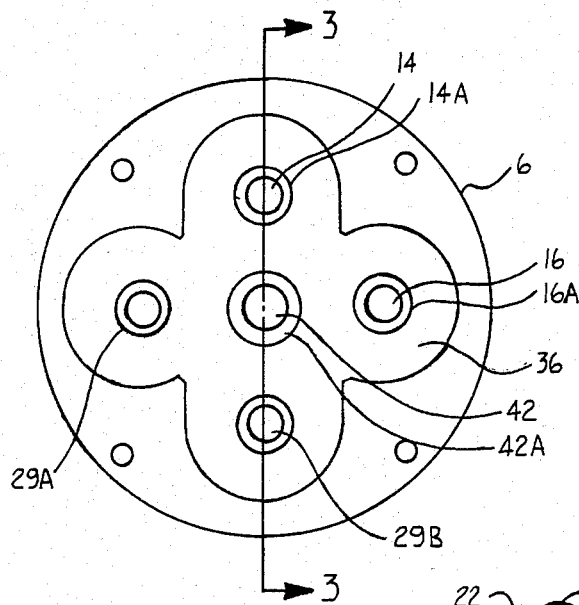
FIG. 2 is a plan view of half of the casing.
Figure 3:
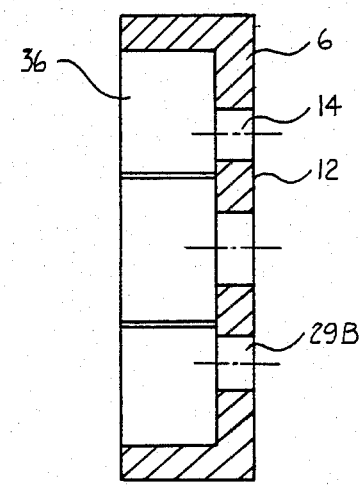
FIG. 3 is a section taken along lines 3—3 of FIG. 2.

Referring to FIGS. 2 and 3, casing half 6 is shown. The casing is preferably constructed of light-weight material such as aluminum. Two solid discs can be milled out to create a cavity 36 wherein is disposed the gears and sprockets as will be discussed later. FIG. 2 and 3 show half of the cavity. The orifices 14 and 16 are shown to have bushings 14A and 16A.

Figure 4:
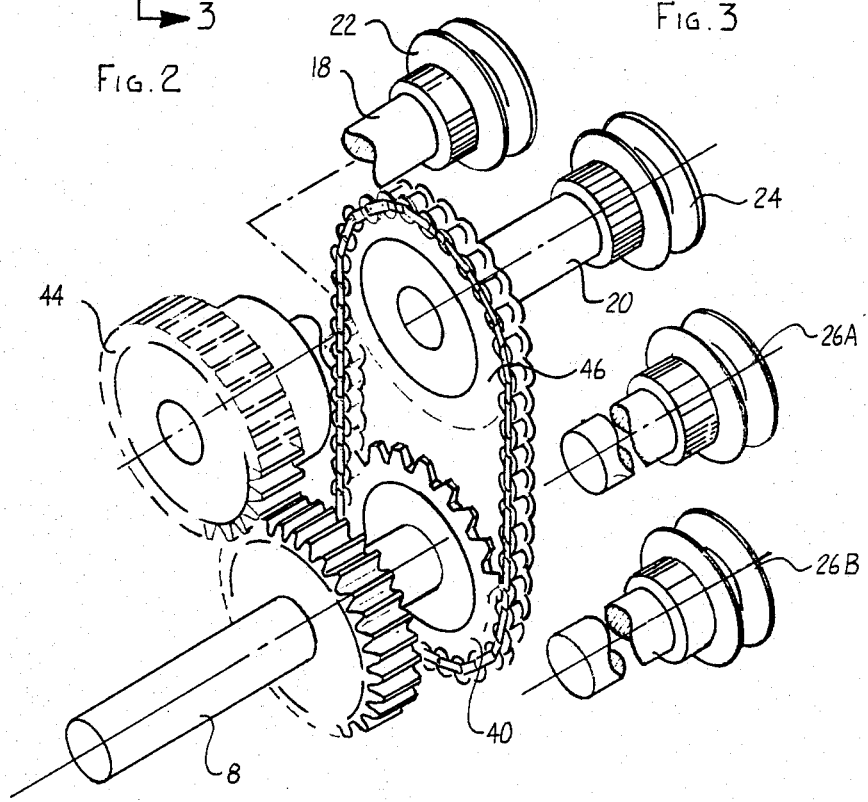
FIG. 4 is a pictorial view of the inner parts of the transmission.

Referring to FIGS. 2 through 4, the first shaft 8 is shown to have a pinon gear 38 affixed thereto. Also affixed to the first shaft 8 is a sprocket 40. The pinon gear 38 and the sprocket 40 are suitably spaced apart on the shaft 8. The first shaft 8 extends slightly beyond the sprocket 40 and is disposed in a orifice 42 defined by the planar surface 12. Around the rim of orifice 42 is bushing 42A. The first pulley 22 can be seen affixed to the end of the second shaft 18, and affixed to the other end of that shaft is a gear wheel 44. The gear wheel 44 meshes with pinion 38 and is driven by same. The second shaft 18 is parallel to the first shaft 8, and it can be seen that the second shaft 18 will rotate in a direction opposite to the first shaft 8.

Referring again to FIGS. 2 and 4, the second pulley 24 can be seen affixed to the third shaft 20, and affixed to the other end of the shaft is a second sprocket 46. The first sprocket 40 and the second sprocket 46 are coupled together by chain 48. The third shaft 20 is parallel to the first shaft 8, and it can be seen that the third shaft 20 will rotate in the same direction as the first shaft 8. The two freely turning pulleys 26A and 26B are shown affixed to a pair of shafts 27A and 27B. Those two shafts extend through a pair of orifices 29A and 29B into the casing 2. Preferably the shafts 27A and 27B mate with orifices defined by the other half of the casing 4.

It should be noted that the two casing halves 4 and 6 can be identical pieces such that either half can serve as the pulley half. It should also be noted that although the pulleys are depicted as being on the side of the casing opposite to the first shaft, that does not necessarily have to be the case. This invention will function equally as well with the pulleys and the first shaft on the same side of the casing. Furthermore, if the gears and sprockets are properly dimensioned and positioned, the configuration will be reversible, that is, a user will be able to select which side of the invention he or she wishes to have the pulleys with respect to the first shaft.

Figures 5, 6, 7:
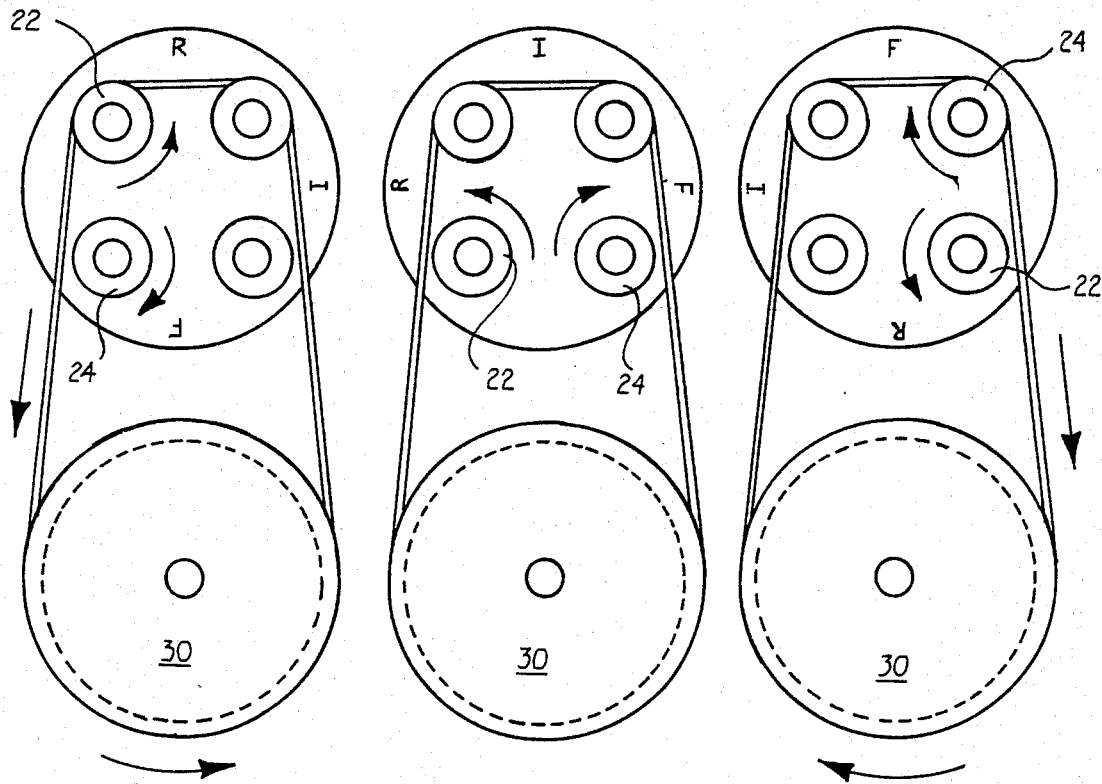
FIG. 5 is a diagrammatical view of the transmission in a reverse position.
FIG. 6 is a diagrammatical view of the transmission in its idle position.
FIG. 7 is a diagrammatical view of the transmission in its forward position.

Referring to FIGS. 5, 6 and 7, the three positions of the casing are shown. FIG. 5 shows us the casing in the reverse position, that is, the belt is in contact with the first pulley 22 which causes the drive shaft pulley 30 to rotate in a direction opposite to the first shaft 8. The reverse position is indicated by the "R" at the top of the casing. FIG. 6 shows us the casing in the idle position as indicated by the "I" at the top of the casing. In this position the belt is not in contact with either of the drive pulleys. FIG. 7 shows the casing in the forward position, that is, the belt is in contact with the second pully 24 causing the drive shaft pulley 30 to rotate in the same direction as the first shaft 8.

As can be seen, it is preferable to have the drive shaft pulley 30 be large enough to keep the belt from contacting more than two pulleys when the casing is in one of its three operating positions. It should be noted that if the casing is prevented from rotating more than 90° in either direction from the idle position, the belt will never be in contact with more than one of the drive pulleys.

As mentioned before this is a clutchless transmission. Any clutching action necessary is provided by natural slippage of the belt. In other words, as the casing is rotated from the idle position to either the forward or reverse position there will be some natural slippage between the belt and the drive pulley due to the inertia of the drive shaft train. For small engine applications this is not a problem and will not cause undue wear and tear on the belt.

Although this invention was shown to use a sprocket and chain combination to drive the second pulley, that is, the pulley which turns in the same direction as the first shaft 8, it should be noted that a conventional gear arrangement can be used in lieu of the sprocket and chain to drive said pulley in said direction.

It should also be noted that the first shaft 8 can be the actual crank shaft of the engine. The fact that this invention is light weight and easily disassembled, permits direct usage of the crank shaft.

The foregoing was given for illustrative purposes only and no unnecessary limitations in the following claims should be drawn therefrom.

I claim:

1. A transmission for transmitting rotational power from an engine to a drive shaft comprising:
   (a) a first shaft means for transmitting rotational power from the engine to the transmission,
   (b) a casing coaxially rotatable about the first shaft, the first shaft extending into the casing through an orifice defined by the casing,
   (c) first, second, third and fourth casing pulleys each rotatably affixed to the casing and spaced apart from each other such that each of the pulleys occupies one corner of an imaginary square, the planes of all the pulleys being aligned in a single plane generally perpendicular to the axis of casing rotation, the first and second casing pulleys occupying adjacent corners of the imaginary square, the diagonals of the imaginary square intersecting a longitudinal axis of the first shaft,
   (d) a means disposed within the casing to transmit rotational power from the first shaft to the first casing pulley such that the first casing pulley rotates in a direction opposite to the direction of rotation of the first shaft,
   (e) a means disposed in the casing to transmit rotational power from the first shaft to the second casing pulley such that the second casing pulley rotates in the same direction as the direction of rotation of the first shaft,
   (f) a pulley affixed to a drive shaft, the plane of the pulley being aligned with the plane of the casing pulleys,
   (g) a belt means for coupling the drive shaft pulley with at least two of the casing pulleys, and
   (h) a means for rotating the casing to at least a first, second, and a third position, the drive shaft pulley being adapted to permit the belt when suitably taut to be in contact with only two casing pulleys when the casing is in the first, second and third positions, the first position being when the belt is in contact with the first casing pulley and either the third or fourth casing pulley, the second position being when the belt is in contact with only the third and fourth casing pulleys, the third position being when the belt is in contact with only the second casing pulley and either the third or fourth casing pulley.

2. The transmission of claim 1 wherein the casing is shaped like a disc and is disposed concentric with the first shaft.

3. The transmission of claim 1 or 2 wherein a gear means disposed in the casing is used to transmit rotational power from the first shaft to the first pulley.

4. The transmission of claim 3 wherein a gear means disposed in the casing is used to transmit rotational power from the first shaft to the second pulley.

5. The transmission of claim 3 wherein a chain and sprocket means disposed in the casing is used to transmit rotational power from the first shaft to the second pulley.

6. The transmission of claim 1 or 2 wherein the casing comprises two identical halves.

7. The transmission of claim 5 wherein the casing comprises two identical halves.

8. The transmission of claim 3 wherein the casing comprises two identical halves.

9. The transmission of claim 4 wherein the casing comprises two identical halves.

* * * * *